(12) United States Patent
Otsuka et al.

(10) Patent No.: US 11,664,499 B2
(45) Date of Patent: May 30, 2023

(54) LITHIUM RECHARGEABLE BATTERY AND CARD WITH BUILT-IN BATTERY

(71) Applicant: NGK INSULATORS, LTD., Nagoya (JP)

(72) Inventors: Haruo Otsuka, Nagoya (JP); Yuki Fujita, Nagoya (JP); Nobuyuki Kobayashi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 327 days.

(21) Appl. No.: 16/903,790

(22) Filed: Jun. 17, 2020

(65) Prior Publication Data
US 2020/0313123 A1 Oct. 1, 2020

Related U.S. Application Data

(63) Continuation of application No. PCT/JP2019/007464, filed on Feb. 27, 2019.

(30) Foreign Application Priority Data

Mar. 28, 2018 (JP) .............................. JP2018-063175

(51) Int. Cl.
*H01M 4/525* (2010.01)
*H01M 4/587* (2010.01)
(Continued)

(52) U.S. Cl.
CPC ........... *H01M 4/587* (2013.01); *H01M 4/525* (2013.01); *H01M 10/0525* (2013.01);
(Continued)

(58) Field of Classification Search
CPC .......... H01M 50/116; H01M 50/4295; H01M 50/12; H01M 50/124; H01M 50/44;
(Continued)

(56) References Cited

U.S. PATENT DOCUMENTS 9,379,375 B2 6/2016 Sugiura et al.
10,454,109 B2 10/2019 Ohira et al.
(Continued)

FOREIGN PATENT DOCUMENTS

JP 2001-052742 A1 2/2001
JP 2006269288 A * 10/2006
(Continued)

OTHER PUBLICATIONS

English translation of the Written Opinion (Application No. PCT/JP2019/007464) dated Apr. 23, 2019.
(Continued)

*Primary Examiner* — Matthew T Martin
*Assistant Examiner* — Justin C. King
(74) *Attorney, Agent, or Firm* — Burr Patent Law, PLLC

(57) ABSTRACT

Provided is a lithium secondary battery including: a positive electrode plate which is a lithium complex oxide sintered plate; a negative electrode layer; a separator; an electrolytic solution; and a pair of exterior films having outer peripheral edges sealed with each other to form an internal space that accommodates the battery elements, wherein the portions of the negative electrode layer and the separator corresponding to the outer extension of the battery is deviated toward the positive electrode plate side from the portions of the negative electrode layer and the separator corresponding to the body of the battery.

13 Claims, 6 Drawing Sheets

(51) Int. Cl.
- *H01M 10/0525* (2010.01)
- *H01M 50/44* (2021.01)
- *H01M 50/124* (2021.01)
- *H01M 50/429* (2021.01)
- *H01M 50/463* (2021.01)
- *H01M 50/414* (2021.01)
- *H01M 50/417* (2021.01)
- *H01M 50/133* (2021.01)
- *H01M 50/121* (2021.01)
- *H01M 50/119* (2021.01)

(52) U.S. Cl.
CPC ....... *H01M 50/119* (2021.01); *H01M 50/121* (2021.01); *H01M 50/124* (2021.01); *H01M 50/133* (2021.01); *H01M 50/414* (2021.01); *H01M 50/417* (2021.01); *H01M 50/429* (2021.01); *H01M 50/4295* (2021.01); *H01M 50/44* (2021.01); *H01M 50/463* (2021.01); *H01M 2220/30* (2013.01)

(58) Field of Classification Search
CPC ............. H01M 50/411; H01M 50/525; H01M 50/587; H01M 10/0525; H01M 2220/30
See application file for complete search history.

(56) References Cited

U.S. PATENT DOCUMENTS

| | | | | |
|---|---|---|---|---|
| 2006/0237543 | A1* | 10/2006 | Goto | G06K 19/077 235/492 |
| 2015/0287962 | A1* | 10/2015 | Abe | H01M 50/119 429/179 |
| 2016/0211506 | A1* | 7/2016 | Yura | C30B 29/22 |
| 2016/0276711 | A1* | 9/2016 | Izumo | H01L 49/00 |
| 2018/0233731 | A1 | 8/2018 | Yura et al. | |
| 2019/0355970 | A1 | 11/2019 | Yura et al. | |

FOREIGN PATENT DOCUMENTS

| | | | |
|---|---|---|---|
| JP | 2006-331838 A1 | | 12/2006 |
| JP | 2013048041 A | * | 3/2013 |
| JP | 5587052 B2 | | 9/2014 |
| JP | 2017-079192 A1 | | 4/2017 |
| WO | 2014/050569 A1 | | 4/2014 |
| WO | 2017/146088 A1 | | 8/2017 |
| WO | 2017/188238 A1 | | 11/2017 |
| WO | 2018/147387 A1 | | 8/2018 |

OTHER PUBLICATIONS

International Search Report and Written Opinion (Application No. PCT/JP2019/007464) dated Apr. 23, 2019.

* cited by examiner

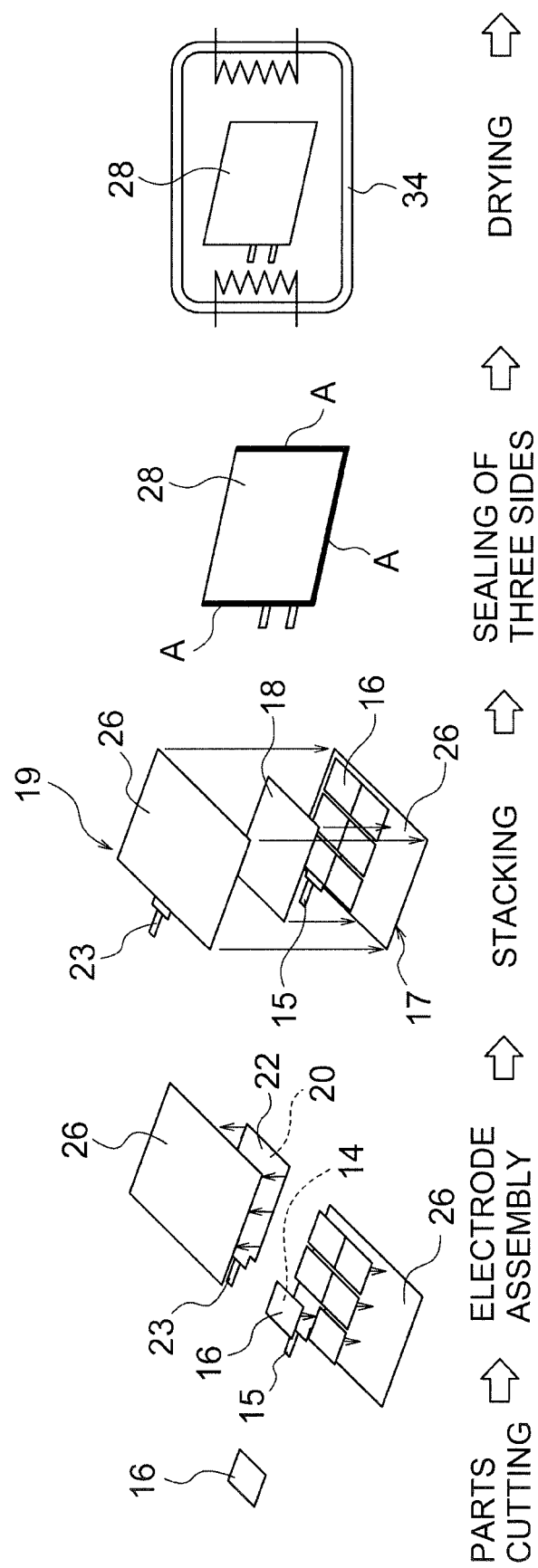

LITHIUM RECHARGEABLE BATTERY AND CARD WITH BUILT-IN BATTERY

CROSS-REFERENCE TO RELATED APPLICATIONS

This application is a continuation application of PCT/JP2019/007464 filed Feb. 27, 2019, which claims priority to Japanese Patent Application No. 2018-063175 filed Mar. 28, 2018, the entire contents all of which are incorporated herein by reference.

BACKGROUND OF THE INVENTION

1. Field of the Invention

The present invention relates to a lithium secondary battery and a card with built-in battery.

2. Description of the Related Art

In recent years, smart cards with built-in battery are being put into practical use. Examples of smart cards with built-in primary battery include credit cards with one-time password display function. Examples of smart cards with built-in secondary battery include cards with fingerprint authentication and wireless communication functions provided with wireless communication IC, ASIC for fingerprint analysis, and a fingerprint sensor. Such batteries for smart cards are generally required to have properties such as a thickness of less than 0.45 mm, a high capacity and a low resistance, a bending resistance, and a thermal resistance to withstand the processing temperature.

Secondary batteries or cards with secondary battery for such applications have been proposed. For example, Patent Literature 1 (JP2017-79192A) discloses a secondary battery to be built in a plate member such as a card and having a sufficient strength even in the case where the plate member is bent and deformed. The secondary battery includes an electrode assembly including a positive electrode and a negative electrode, a sheet-like laminate film-covered body the outer peripheral side of which is welded while covering the electrode assembly, and a positive electrode connection terminal and a negative electrode connection terminal with one end side connected to the electrode assembly and the other end side extending outward from the laminate film-covered body. Further, Patent Literature 2 (JP2006-331838A) discloses a thin battery on the surface of which large wrinkles are less likely to occur and which has excellent flexibility. The thin battery includes: a battery body accommodating a separator, a positive electrode layer, and a negative electrode layer between a positive electrode current collector and a negative electrode current collector; and a seal part including a frame member made of resin and hermetically sealing the periphery of the battery body, wherein $100 \ \mu m \leq D1 \leq 320 \ \mu m$ and $D1/D2 \leq 0.85$ are satisfied when the thickness of the seal part is referred to as D1, and the maximum thickness of the battery center is referred to as D2. In the secondary batteries disclosed in Patent Literatures 1 and 2 above, powder-dispersed positive electrodes produced by applying a positive electrode mixture containing a positive electrode active material, a conductive agent, a binder, and the like, followed by drying, are employed.

Meanwhile, such powder-dispersed positive electrodes generally contain a relatively large amount (e.g., about 10% by weight) of components (such as binders and conductive agents) that do not contribute to the capacity of battery, resulting in a low packing density of the positive electrode active material, i.e., lithium complex oxide. Accordingly, the powder-dispersed positive electrode should be greatly improved from the viewpoint of the capacity and charge/discharge efficiency. Some attempts have been made to improve the capacity and charge/discharge efficiency by positive electrodes or layers of positive electrode active material composed of lithium complex oxide sintered plate. In this case, since the positive electrode or the layer of positive electrode active material contains no binder or conductive agent, high capacity and satisfactory charge/discharge efficiency can be expected due to a high packing density of lithium complex oxide. For example, Patent Literature 3 (JP5587052B) discloses a positive electrode including a positive electrode current collector and a positive electrode active material layer connected to the positive electrode current collector with a conductive bonding layer therebetween. The positive electrode active material layer is composed of a lithium complex oxide sintered plate, and the sintered plate has a thickness of 30 μm or more, a porosity of 3 to 30%, and an open pore rate of 70% or more. Further, Patent Literature 4 (WO2017/146088) discloses use of an oriented sintered plate including a plurality of primary grains composed of lithium complex oxide such as lithium cobaltate ($LiCoO_2$), the plurality of primary grains being oriented at an average orientation angle of over 0° and 30° or less to the plate face in the positive electrode plate, as a positive electrode of a lithium secondary battery including a solid electrolyte.

CITATION LIST

Patent Literature

Patent Literature 1: JP2017-79192A
Patent Literature 2: JP2006-331838A
Patent Literature 3: JP5587052B
Patent Literature 4: WO2017/146088

SUMMARY OF THE INVENTION

However, such cards with built-in film-covered battery including a lithium complex oxide sintered plate (positive electrode plate), as disclosed in Patent Literatures 3 and 4, have a problem that wrinkles are likely to occur on the card surface in the vicinity of the end of the positive electrode plate when a repeated bending test over hundreds of times required by JIS (Japanese Industrial Standards) is performed.

The inventors have now found that, in a lithium secondary battery in the form of a film-covered battery including a positive electrode sintered plate, wrinkles are less likely to occur in the vicinity of the end of the positive electrode plate, even if bending is repeated, when the portions of the negative electrode layer and the separator corresponding to the outer extension of the battery are deviated toward the positive electrode plate side from the portions of the negative electrode layer and the separator corresponding to the body of the battery. In particular, they have found that wrinkles are less likely to occur in the vicinity of the end of the positive electrode plate, also in the case where a repeated bending test over hundreds of times required in JIS is performed on a film-covered lithium secondary battery satisfying the aforementioned conditions in the form of a card with built-in battery.

Accordingly, an object of the present invention is to provide a lithium secondary battery in film-covered form including a lithium composite oxide sintered plate as a positive electrode plate, wherein wrinkles are less likely to occur in the vicinity of the end of the positive electrode plate even if the battery (particularly, in the form of a card with built-in battery) is repeatedly bent.

According to an aspect of the present invention, there is provided a lithium secondary battery comprising:
- a positive electrode plate which is a lithium complex oxide sintered plate;
- a negative electrode layer which has a size larger than the size of the positive electrode plate and contains carbon;
- a separator which is interposed between the positive electrode plate and the negative electrode layer and has a size larger than the sizes of the positive electrode plate and the negative electrode layer;
- an electrolytic solution with which the positive electrode plate, the negative electrode layer, and the separator are impregnated; and
- a pair of exterior films having outer peripheral edges sealed with each other to form an internal space, the internal space accommodating the positive electrode plate, the negative electrode layer, the separator, and the electrolytic solution,
- wherein the separator has an outer peripheral portion in close contact with at least the outer peripheral edge of the exterior film on the positive electrode plate side or a peripheral region in the vicinity thereof, so as to separate a compartment accommodating the positive electrode and a compartment accommodating the negative electrode from each other,
- wherein the lithium secondary battery comprises:
- a body in which a multi-layer structure including the positive electrode plate, the separator, the negative electrode layer, and the pair of exterior films exists throughout the entire area; and
- an outer extension which is located outwardly of the outer peripheral edge of the positive electrode plate and includes the separator, the negative electrode layer, and the pair of exterior films, and
- wherein the portions of the negative electrode layer and the separator corresponding to the outer extension are deviated toward the positive electrode plate side from the portions of the negative electrode layer and the separator corresponding to the body.

According to another aspect of the present invention, there is provided a card with built-in battery, comprising: a resin substrate; and the aforementioned lithium secondary battery embedded within the resin substrate.

BRIEF DESCRIPTION OF THE DRAWINGS

FIG. 2A illustrates an example of the first half of the production process of the lithium secondary battery.

FIG. 2B includes an image of a film-covered battery at the right end.

DETAILED DESCRIPTION OF THE INVENTION

Lithium Secondary Battery

Figure 1A:
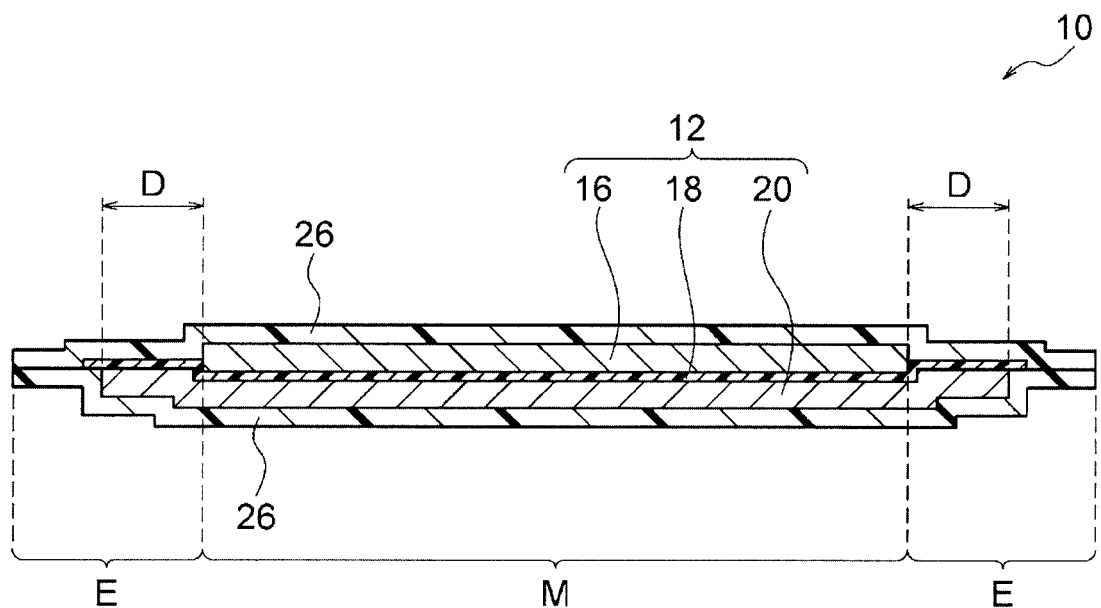
FIG. 1A is a schematic sectional view of conceptually showing an example of a lithium secondary battery of the present invention.
Figure 1B:
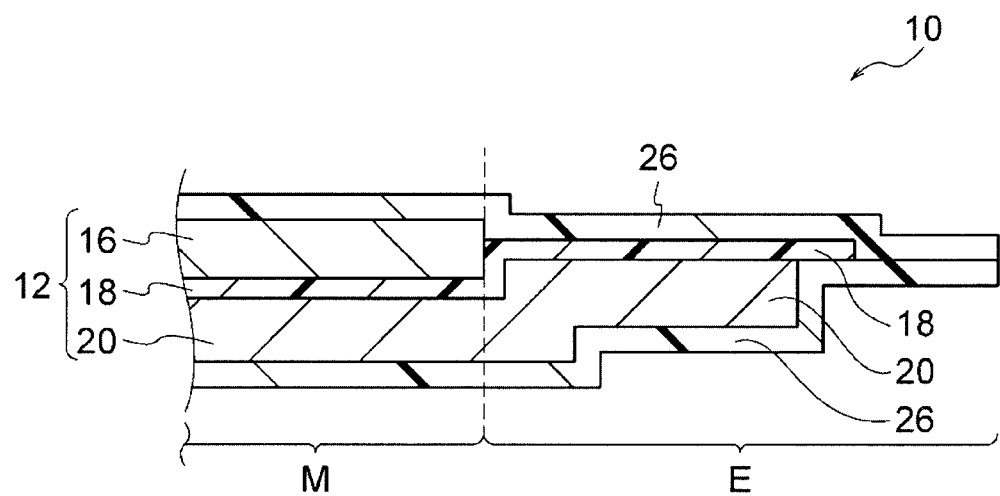
FIG. 1B is a schematic sectional view showing an enlarged structure of the outer extension of the lithium secondary battery shown in FIG. 1A.

FIGS. 1A and 1B schematically show an example of a lithium secondary battery of the present invention. A lithium secondary battery 10 shown in FIGS. 1A and 1B has a positive electrode plate 16, a separator 18, a negative electrode layer 20, an electrolytic solution (not shown), and a pair of exterior films 26. The positive electrode plate 16 is a lithium complex oxide sintered plate. The negative electrode layer 20 contains carbon and has a size larger than the size of the positive electrode plate 16. The separator 18 is interposed between the positive electrode plate 16 and the negative electrode layer 20 and has a size larger than the sizes of the positive electrode plate 16 and the negative electrode layer 20. The positive electrode plate 16, the negative electrode layer 20, and the separator 18 are impregnated with the electrolytic solution. The pair of exterior films 26 have outer peripheral edges sealed with each other to form an internal space, and the internal space accommodates the positive electrode plate 16, the negative electrode layer 20, the separator 18, and the electrolytic solution. The separator 18 has an outer peripheral portion in close contact with at least the outer peripheral edge of the exterior film 26 on the positive electrode plate 16 side or a peripheral region in the vicinity thereof, to separate a compartment accommodating the positive electrode plate 16 and a compartment accommodating the negative electrode layer 20 from each other. Further, the lithium secondary battery 10 includes a body M in which a multi-layer structure including the positive electrode plate 16, the separator 18, the negative electrode layer 20, and the pair of exterior films 26 exists throughout the entire area, and an outer extension E which is located outwardly of the outer peripheral edge of the positive electrode plate 16 and includes the separator 18, the negative electrode layer 20, and the pair of exterior films 26. The portions of the negative electrode layer 20 and the separator 18 corresponding to the outer extension E are deviated toward the positive electrode plate 16 side from the portions of the negative electrode layer 20 and the separator 18 corresponding to the body M. In this way, in the lithium secondary battery 10 in the form of a film-covered battery including a positive electrode sintered plate, wrinkles are less likely to occur in the vicinity of the end of the positive electrode plate, even if bending is repeated, when the portions of the negative electrode layer 20 and the separator 18 corresponding to the outer extension E are deviated toward the positive electrode plate 16 side from the portions of the negative electrode layer 20 and the separator 18 corresponding to the body M. In particular, wrinkles are less likely to occur in the vicinity of the end of the positive electrode plate, even in the case where the lithium secondary battery 10 in the form of a card with built-in battery that satisfies the aforementioned conditions is subjected to a repeated bending test over hundreds of times required in JIS.

That is, the cards with built-in film-covered battery including a lithium complex oxide sintered plate (positive electrode plate) as disclosed in Patent Literatures 3 and 4 have a problem that wrinkles are likely to occur on the card surface in the vicinity of the end of the positive electrode plate in the case where a repeated bending test over hundreds of times required in JIS is performed, as described above. In this respect, the lithium secondary battery of the present invention can effectively reduce such wrinkles. This is probably because the outlines of the exterior films 26 following the shapes of the positive electrode plate 16 and the negative electrode layer 20 each have a cross-sectional shape converging toward the outer peripheral edge in multiple steps by forming the portions of the negative electrode layer 20 and the separator 18 corresponding to the outer extension E to be deviated toward the positive electrode plate 16 side from the portions corresponding to the body M, as specifically shown in FIG. 1B, as a result of which the end of the positive electrode plate 16 becomes less likely to push up the exterior film 26. Accordingly, the lithium secondary battery 10 of the present invention is preferably a thin secondary battery capable to be built in a card, more preferably a thin secondary battery for being embedded in a resin substrate to form a card. That is, another preferable aspect of the present invention provides a card with built-in battery including a resin substrate and a lithium secondary battery embedded in the resin substrate. The card with built-in battery typically includes a pair of resin films and a lithium secondary battery interposed between the pair of resin films, and the resin films are preferably bonded to each other by an adhesive or thermally fused with each other by hot pressing.

As described above, the portions of the negative electrode layer 20 and the separator 18 corresponding to the outer extension E are deviated toward the positive electrode plate 16 side from the portions of the negative electrode layer 20 and the separator 18 corresponding to the body M. Here, the phrase "being deviated toward the positive electrode plate 16 side" means that, when a center line passing through the center in the thickness direction of the negative electrode layer 20 or the separator 18 is drawn in a cross section of the lithium secondary battery 10, the center line in the outer extension E is shifted toward the positive electrode plate 16 side (that is, toward the exterior film 26 in contact with the positive electrode plate 16) from the center line in the body M. In other words, the portions of the negative electrode layer 20 and the separator 18 corresponding to the outer extension E enters (cuts into) the outer region around the positive electrode plate 16.

The positive electrode plate 16 is a lithium complex oxide sintered plate. The fact that the positive electrode plate 16 is a sintered plate means that the positive electrode plate 16 contains no binder. This is because, even if a binder is contained in a green seat, the binder disappears or burns out during firing. Then, since the positive electrode plate 16 contains no binder, there is an advantage that deterioration of the positive electrode due to the electrolytic solution can be avoided. The lithium complex oxide constituting the sintered plate is particularly preferably lithium cobaltate (typically, LiCoO$_2$ (which will be hereinafter abbreviated as LCO)). Various lithium complex oxide sintered plates or LCO sintered plates are known, and those disclosed in Patent Literature 3 (JP5587052B) and Patent Literature 4 (WO2017/146088) can be used, for example.

Figure 3:
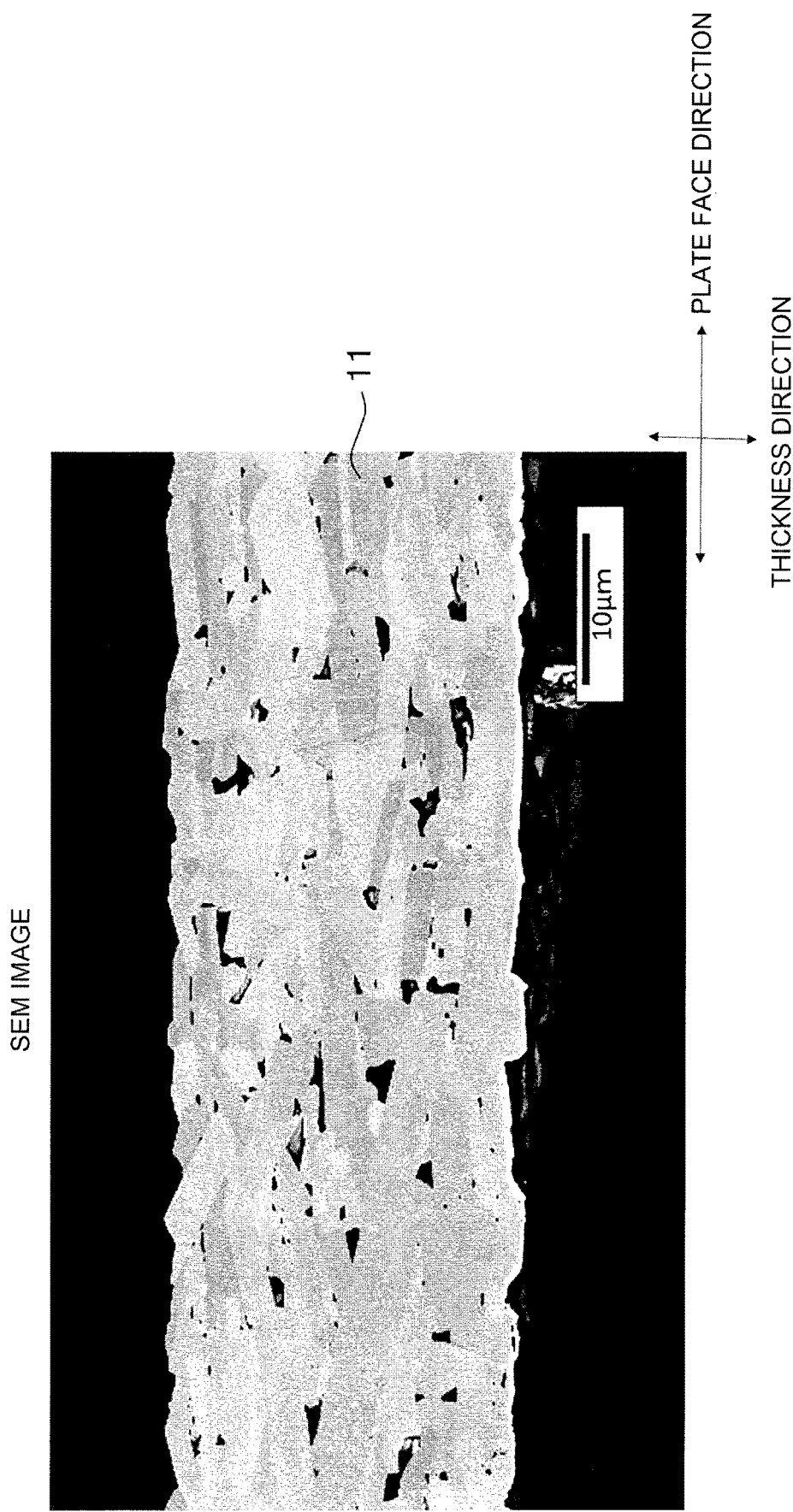
FIG. 3 is a SEM image showing an example of a cross section perpendicular to the plate face of an oriented positive electrode plate.
Figure 4:
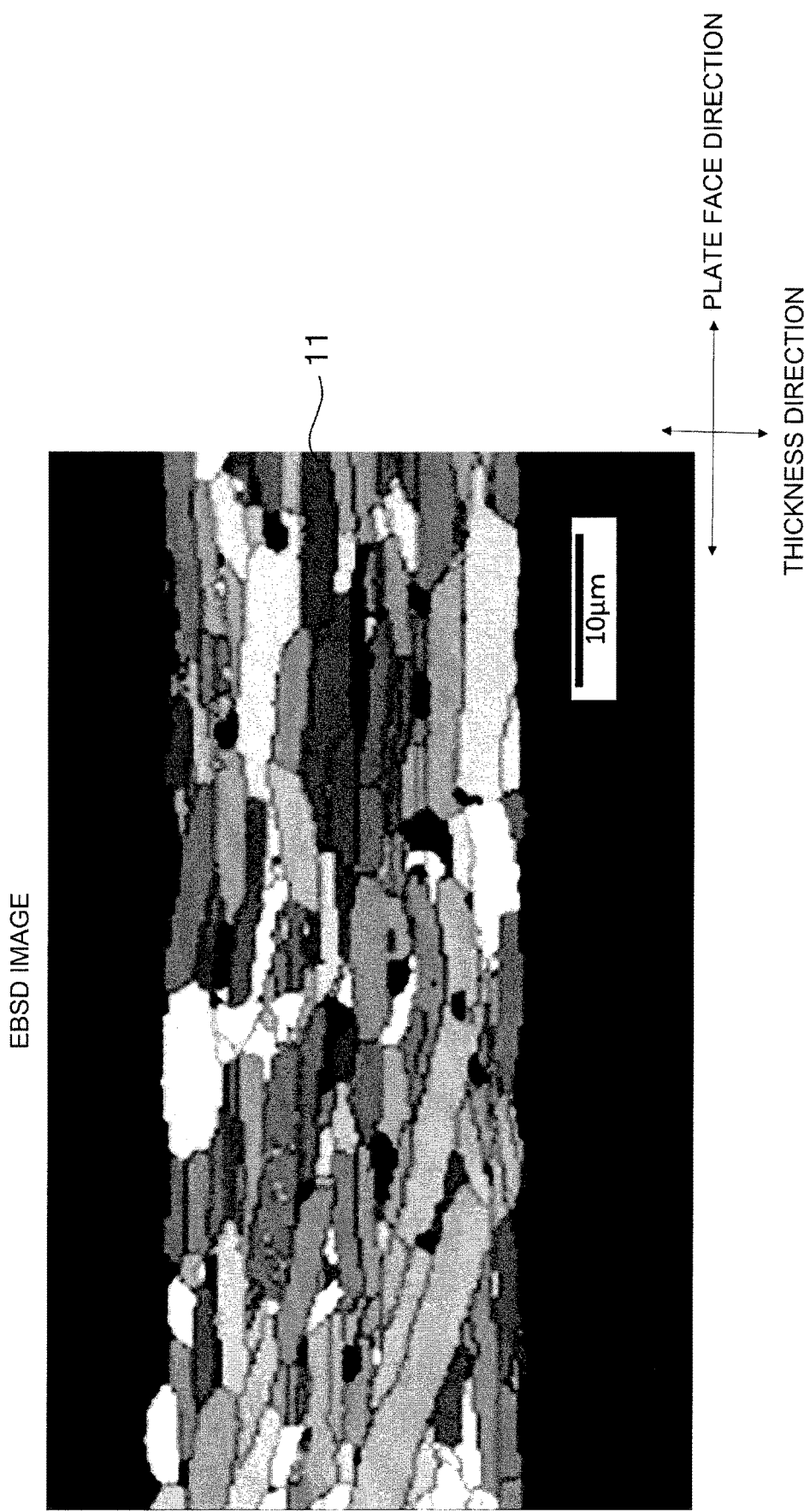
FIG. 4 is an EBSD image in the cross section of the oriented positive electrode plate shown in FIG. 3.
Figure 5:
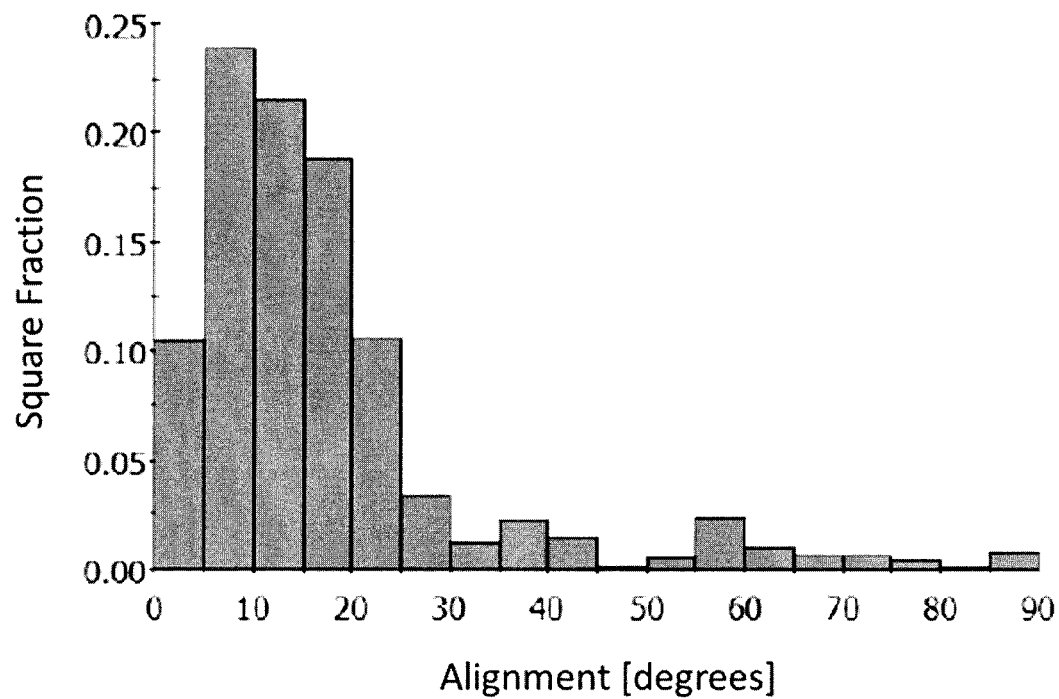
FIG. 5 is an area-based histogram showing the distribution of orientation angles of primary grains in the EBSD image shown in FIG. 4.

According to a preferable aspect of the present invention, the positive electrode plate 16, that is, the lithium complex oxide sintered plate is an oriented positive electrode plate including a plurality of primary grains composed of lithium complex oxide, the plurality of primary grains being oriented at an average orientation angle of over 0° and 30° or less to the plate face of the positive electrode plate. FIG. 3 shows an example of a SEM image in a cross section perpendicular to the plate face of the oriented positive electrode plate 16, and FIG. 4 shows an electron backscatter diffraction (EBSD: Electron Backscatter Diffraction) image in a cross section perpendicular to the plate face of the oriented positive electrode plate 16. Further, FIG. 5 shows an area-based histogram showing the distribution of orientation angles of primary grains 11 in the EBSD image shown in FIG. 4. In the EBSD image shown in FIG. 4, the discontinuity of crystal orientation can be observed. In FIG. 4, the orientation angle of each primary grain 11 is indicated by the shading of color. A darker color indicates a smaller orientation angle. The orientation angle is a tilt angle formed by plane (003) of the primary grains 11 to the plate face direction. In FIGS. 3 and 4, the points shown in black within the oriented positive electrode plate 16 represent pores.

The oriented positive electrode plate 16 is an oriented sintered body composed of the plurality of primary grains 11 bound to each other. The primary grains 11 are each mainly in the form of a plate but may include rectangular, cubic, and spherical grains. The cross-sectional shape of each primary grain 11 is not particularly limited and may be a rectangular shape, a polygonal shape other than the rectangular shape, a circular shape, an elliptical shape, or a complex shape other than above.

The primary grains 11 are composed of a lithium complex oxide. The lithium complex oxide is an oxide represented by Li$_x$MO$_2$ (where 0.05<x<1.10 is satisfied, M represents at least one transition metal, and M typically contains one or more of Co, Ni, and Mn). The lithium complex oxide has a layered rock-salt structure. The layered rock-salt structure refers to a crystalline structure in which lithium layers and transition metal layers other than lithium are alternately stacked with oxygen layers interposed therebetween, that is, a crystalline structure in which transition metal ion layers and single lithium layers are alternately stacked with oxide ions therebetween (typically, an α-NaFeO$_2$ structure, i.e., a cubic rock-salt structure in which transition metal and lithium are regularly disposed in the [111] axis direction). Examples of the lithium complex oxide include Li$_x$CoO$_2$ (lithium cobaltate), Li$_x$NiO$_2$ (lithium nickelate), Li$_x$MnO$_2$ (lithium manganate), Li$_x$NiMnO$_2$ (lithium nickel manganate), Li$_x$NiCoO$_2$ (lithium nickel cobaltate), Li$_x$CoNiMnO$_2$ (lithium cobalt nickel manganate), and Li$_x$CoMnO$_2$ (lithium cobalt manganate), particularly preferably Li$_x$CoO$_2$ (lithium cobaltate, typically LiCoO$_2$). The lithium complex oxide may contain one or more elements selected from Mg, Al, Si, Ca, Ti, V, Cr, Fe, Cu, Zn, Ga, Ge, Sr, Y, Zr, Nb, Mo, Ag, Sn, Sb, Te, Ba, Bi, and W.

As shown in FIGS. 4 and 5, the average of the orientation angles of the primary grains 11, that is, the average orientation angle is over 0° and 30° or less. This brings various advantages as follows. First, since each primary grain 11 lies in a direction inclined from the thickness direction, the adhesion between the primary grains can be improved. As a result, the lithium ion conductivity between a certain primary grain 11 and each of other primary grains 11 adjacent to the primary grain 11 on both sides in the longitudinal direction can be improved, so that the rate characteristic can be improved. Secondly, the rate characteristic can be further improved. This is because, when lithium ions move in and out, the oriented positive electrode plate 16 expands and contracts smoothly since the oriented positive electrode plate 16 expands and contracts more in the thickness direction than in the plate face direction, as described above, and thus the lithium ions also move in and out smoothly.

The average orientation angle of the primary grains 11 is obtained by the following method. First, three horizontal lines that divide the oriented positive electrode plate 16 into four equal parts in the thickness direction and three vertical lines that divide the oriented positive electrode plate 16 into four equal parts in the plate face direction are drawn in an EBSD image of a rectangular region of 95 µm×125 µm observed at a magnification of 1000 times, as shown in FIG. 4. Next, the average orientation angle of the primary grains 11 is obtained by arithmetically averaging the orientation angles of all the primary grains 11 intersecting at least one of the three horizontal lines and the three vertical lines. The average orientation angle of the primary grains 11 is preferably 30° or less, more preferably 25° or less, from the viewpoint of further improving the rate characteristics. From the viewpoint of further improving the rate characteristics, the average orientation angle of the primary grains 11 is preferably 2° or more, more preferably 5° or more.

As shown in FIG. 5, the orientation angles of the primary grains 11 may be widely distributed from 0° to 90°, but most of them are preferably distributed in the region of over 0° and 30° or less. That is, when a cross section of the oriented sintered body constituting the oriented positive electrode plate 16 is analyzed by EBSD, the total area of the primary grains 11 with an orientation angle of over 0° and 30° or less to the plate face of the oriented positive electrode plate 16 (which will be hereinafter referred to as low-angle primary grains) out of the primary grains 11 contained in the cross section analyzed is preferably 70% or more, more preferably 80% or more, with respect to the total area of the primary grains 11 contained in the cross section (specifically, 30 primary grains 11 used for calculating the average orientation angle). Thereby, the proportion of the primary grains 11 with high mutual adhesion can be increased, so that the rate characteristic can be further improved. Further, the total area of grains with an orientation angle of 20° or less among the low-angle primary grains is more preferably 50% or more with respect to the total area of 30 primary grains 11 used for calculating the average orientation angle. Further, the total area of grains with an orientation angle of 10° or less among the low-angle primary grains is more preferably 15% or more with respect to the total area of 30 primary grains 11 used for calculating the average orientation angle.

Since the primary grains 11 are each mainly in the form of a plate, the cross section of each primary grain 11 extends in a predetermined direction, typically in a substantially rectangular shape, as shown in FIGS. 3 and 4. That is, when the cross section of the oriented sintered body is analyzed by EBSD, the total area of the primary grains 11 with an aspect ratio of 4 or more in the primary grains 11 contained in the cross section analyzed is preferably 70% or more, more preferably 80% or more, with respect to the total area of the primary grains 11 contained in the cross section (specifically, 30 primary grains 11 used for calculating the average orientation angle). Specifically, in the EBSD image as shown in FIG. 4, the mutual adhesion between the primary grains 11 can be further improved by above, as a result of which the rate characteristic can be further improved. The aspect ratio of each primary grain 11 is a value obtained by dividing the maximum Feret diameter of the primary grain 11 by the minimum Feret diameter. The maximum Feret diameter is the maximum distance between two parallel straight lines that interpose the primary grain 11 therebetween on the EBSD image in observation of the cross section. The minimum Feret diameter is the minimum distance between two parallel straight lines that interpose the primary grain 11 therebetween on the EBSD image.

The mean diameter of the plurality of primary grains constituting the oriented sintered body is preferably 5 µm or more. Specifically, the mean diameter of the 30 primary grains 11 used for calculating the average orientation angle is preferably 5 µm or more, more preferably 7 µm or more, further preferably 12 µm or more. Thereby, since the number of grain boundaries between the primary grains 11 in the direction in which lithium ions conduct is reduced, and the lithium ion conductivity as a whole is improved, the rate characteristic can be further improved. The mean diameter of the primary grains 11 is a value obtained by arithmetically averaging the equivalent circle diameters of the primary grains 11. An equivalent circle diameter is the diameter of a circle having the same area as each primary grain 11 on the EBSD image.

The denseness of the oriented sintered body constituting the oriented positive electrode plate 16 is preferably 70% or more, more preferably 80% or more, further preferably 90% or more. Thereby, the mutual adhesion between the primary grains 11 can be further improved, so that the rate characteristic can be further improved. The denseness of the oriented sintered body is calculated by polishing a cross section of the positive electrode plate with CP (cross-section polisher) polishing, thereafter observing the cross section at a magnification of 1000 times with SEM, and binarizing the SEM image obtained. The average equivalent circle diameter of pores formed inside the oriented sintered body is not particularly limited but is preferably 8 µm or less. The smaller the average equivalent circle diameter of the pores, the mutual adhesion between the primary grains 11 can be improved more. As a result, the rate characteristic can be improved more. The average equivalent circle diameter of the pores is a value obtained by arithmetically averaging the equivalent circle diameters of 10 pores on the EBSD image. An equivalent circle diameter is the diameter of a circle having the same area as each pore on the EBSD image. The pores formed inside the oriented sintered body may be open pores connected to the outside of the oriented positive electrode plate 16 but preferably do not pass through the oriented positive electrode plate 16. The pores may be closed pores.

The thickness of the positive electrode plate 16 is not specifically limited but is preferably 70 to 120 µm, more preferably 80 to 100 µm, further preferably 80 to 95 µm, particularly preferably 85 to 95 µm. The thickness within such a range can suppress the deterioration of the battery characteristics (particularly, the increase of the resistance value) due to repeated charging and discharging and further reduce the wrinkles in the vicinity of the end of the positive electrode plate 16 due to repeated bending more effectively, while improving the energy density of the lithium secondary battery 10 by increasing the capacity of the active material per unit area. Further, the size of the positive electrode plate 16 is preferably 5 mm×5 mm square or more, more preferably 10 mm×10 mm to 200 mm×200 mm square, further preferably 10 mm×10 mm to 100 mm×100 mm square, in other words, preferably 25 mm$^2$ or more, more preferably 100 to 40000 mm$^2$, further preferably 100 to 10000 mm$^2$.

The negative electrode layer 20 contains carbon as the negative electrode active material. Examples of the carbon include graphite, pyrolytic carbon, cokes, resin fired materials, mesophase small spheres, and mesophase pitches, preferably graphite. Graphite may be any of natural graphite and artificial graphite. The negative electrode layer 20 preferably further contains a binder. Examples of the binder include styrene butadiene rubber (SBR), polyvinylidene fluoride (PVDF), and polytetrafluoroethylene (PTFE), preferably styrene butadiene rubber (SBR) or polyvinylidene fluoride (PVDF). In particular, in the case of using γ-butyrolactone (GBL) having excellent heat resistance as the electrolytic solution, use of styrene butadiene rubber (SBR) as the binder is more preferable since it is less likely to be dissolved in GBL, and deterioration of binder functions due to heating can be avoided.

The thickness of the negative electrode layer 20 is not specifically limited but is preferably 70 to 160 μm, more preferably 80 to 150 μm, further preferably 90 to 140 particularly preferably 100 to 130 μm. The thickness within such a range can reduce the wrinkles in the vicinity of the end of the positive electrode plate 16 due to repeated bending more effectively while improving the energy density of the lithium secondary battery 10 by increasing the capacity of the active material per unit area.

Preferable examples of the separator 18 include separators made of polyolefin, polyimide, polyester (e.g., polyethylene terephthalate (PET)), or cellulose. Examples of the polyolefin include polypropylene (PP), polyethylene (PE), and combination of these. From the viewpoint of being inexpensive, separators made of polyolefin or cellulose are preferable. Further, the surface of the separator 18 may be coated with ceramics such as alumina ($Al_2O_3$), magnesia (MgO), and silica ($SiO_2$). Meanwhile, from the viewpoint of excellent heat resistance, separators made of polyimide or cellulose are preferable. Unlike widely used separators made of polyolefin with poor heat resistance, separators made of polyimide, polyester (e.g., polyethylene terephthalate (PET)), or cellulose themselves have not only excellent heat resistance, but also the component of the electrolytic liquid, γ-butyrolactone (GBL), having excellent heat resistance exhibits excellent wettability thereon. Accordingly, in the case of using an electrolytic solution containing GBL, the electrolytic solution can sufficiently penetrate into the separator (without repelling). Separators made of polyimide are particularly preferable from the viewpoint of the heat resistance. Separators made of polyimide are commercially available and have an advantage of being capable of preventing or delaying the extension of lithium dendrite that deposits during overcharge and the resulting short circuit more effectively by having an extremely complicated microstructure.

The electrolytic solution (not shown) is not specifically limited, and commercially available electrolytic solutions for lithium batteries such as a solution obtained by dissolving a lithium salt (e.g., $LiPF_6$) in an organic solvent (e.g., a mixed solvent of ethylene carbonate (EC) and methylethyl carbonate (MEC), a mixed solvent of ethylene carbonate (EC) and diethyl carbonate (DEC), or a mixed solvent of ethylene carbonate (EC) and ethyl methyl carbonate (EMC)) may be used.

In the case of forming a lithium secondary battery having excellent heat resistance, the electrolytic solution preferably contains lithium borofluoride ($LiBF_4$) in a non-aqueous solvent. In this case, the non-aqueous solvent may be a single solvent composed of γ-butyrolactone (GBL) or may be a mixed solvent composed of γ-butyrolactone (GBL) and ethylene carbonate (EC). The non-aqueous solvent has an increased boiling point by containing γ-butyrolactone (GBL), which considerably improves the heat resistance. From such a viewpoint, the volume ratio of EC:GBL in the non-aqueous solvent is preferably 0:1 to 1:1 (GBL ratio: 50 to 100% by volume), more preferably 0:1 to 1:1.5 (GBL ratio: 60 to 100% by volume), further preferably 0:1 to 1:2 (GBL ratio: 66.6 to 100% by volume), particularly preferably 0:1 to 1:3 (GBL ratio: 75 to 100% by volume). The lithium borofluoride ($LiBF_4$) to be dissolved in the non-aqueous solvent is an electrolyte having a high decomposition temperature, which also considerably improves the heat resistance. The $LiBF_4$ concentration in the electrolytic solution is preferably 0.5 to 2 mol/L, more preferably 0.6 to 1.9 mol/L, further preferably 0.7 to 1.7 mol/L, particularly preferably 0.8 to 1.5 mol/L.

The electrolytic solution preferably further contains vinylene carbonate (VC) and/or fluoroethylene carbonate (FEC) and/or vinyl ethylene carbonate (VEC) as additives. Both VC and FEC have excellent heat resistance. Accordingly, a SEI film having excellent heat resistance can be formed on the surface of the negative electrode layer 20 by the electrolytic solution containing such additives.

The thickness of the lithium secondary battery 10 is preferably 350 to 500 μm, more preferably 380 to 450 μm, further preferably 400 to 430 μm. The thickness within such a range can make a thin lithium battery suitable for being built in a thin device such as a smart card. Further, it also contributes to reducing the wrinkles in the vicinity of the end of the positive electrode plate 16 due to repeated bending.

The outer peripheral edges of the pair of exterior films 26 are sealed with each other to form an internal space, and the internal space accommodates battery elements 12 and the electrolytic solution. That is, as shown in FIGS. 1A and 1B, the battery elements 12 that are components of the lithium secondary battery 10 and the electrolytic solution are packaged and sealed with the pair of exterior films 26. As a result, the lithium secondary battery 10 is in the form of a so-called film-covered battery. Here, the battery elements 12 are defined as containing the positive electrode plate 16, the separator 18, and the negative electrode layer 20 and typically further contain a positive electrode current collector (not shown) and a negative electrode current collector (not shown). The positive electrode current collector and the negative electrode current collector are not specifically limited but are preferably metal foils such as copper foils and aluminum foils. The positive electrode current collector is preferably interposed between the positive electrode plate 16 and the exterior film 26, and the negative electrode current collector is preferably interposed between the negative electrode layer 20 and the exterior film 26. Further, the positive electrode current collector is preferably provided with a positive electrode terminal extending from the positive electrode current collector, and the negative electrode current collector is preferably provided with a negative electrode terminal extending from the negative electrode current collector. The outer edges of the lithium secondary battery 10 are preferably sealed by the exterior films 26 thermally fused with each other. The sealing by thermal fusion is preferably performed using a heat bar (referred to also as heating bar) generally used for heat sealing applications. The outer peripheral edges of the pair of exterior films 26 are typically in the form of the four sides of the lithium secondary battery 10 and are preferably sealed throughout all the outer peripheral four sides.

Commercially available exterior films may be used as the exterior films 26. The thickness per piece of the exterior films 26 is preferably 50 to 80 more preferably 55 to 70 μm, further preferably 55 to 65 μm. Preferable examples of the exterior film 26 include a laminate film containing a resin film and a metal foil, more preferably an aluminum laminate film containing a resin film and an aluminum foil. The laminate film is preferably provided with resin films on both sides of the metal foil such as an aluminum foil. In this case, it is preferable that the resin film on one side of the metal foil (which will be hereinafter referred to as a surface protective film) be composed of a material with excellent reinforcing properties such as nylon, polyamide, polyethylene terephthalate, polyimide, polytetrafluoroethylene, and polychlorotrifluoroethylene, and the resin film on the other side of the metal foil be composed of a heat sealing material such as polypropylene.

As described above, the negative electrode layer 20 has a size larger than the size of the positive electrode plate 16, whereas the separator 18 has a size larger than the sizes of the positive electrode plate 16 and the negative electrode layer 20. The separator 18 has an outer peripheral portion in close contact with at least the outer peripheral edge of the exterior film 26 on the positive electrode plate 16 side or a peripheral region in the vicinity thereof to separate a compartment accommodating the positive electrode plate 16 and a compartment accommodating the negative electrode layer 20 from each other. Further, the outer peripheral portion of the separator 18 may be in close contact also with the outer peripheral edge of the exterior film 26 on the negative electrode layer 20 side or a peripheral region in the vicinity thereof.

The end of the positive electrode plate 16 and the end of the negative electrode layer 20 are preferably apart from each other at a distance D of 50 to 2000 μm, more preferably 200 to 1500 μm, further preferably 200 to 1000 μm, particularly preferably 200 to 800 μm, particularly more preferably 450 to 600 μm, most preferably 450 to 550 μm, throughout the outer peripheries of the positive electrode plate 16 and the negative electrode layer 20. Here, the distance D between the end of the positive electrode plate 16 and the end of the negative electrode layer 20 means the distance from the end of the positive electrode plate 16 to the end of the negative electrode layer 20 in the vicinity thereof, as shown in FIG. 1A. In other words, the distance D means a width of the negative electrode layer 20 extending from the positive electrode plate 16.

Method for Producing Lithium Cobaltate Oriented Sintered Plate

The oriented positive electrode plate or the oriented sintered plate that is preferably used for the lithium secondary battery of the present invention may be produced by any production method but is preferably produced through (1) production of $LiCoO_2$ template particles, (2) production of matrix particles, (3) production of green sheet, and (4) production of oriented sintered plate, as exemplified below.

(1) Production of $LiCoO_2$ Template Particles $Co_3O_4$ raw material powder is mixed with $Li_2CO_3$ raw material powder. The mixed powder obtained is fired at 500 to 900° C. for 1 to 20 hours, to synthesize $LiCoO_2$ powder. The resultant $LiCoO_2$ powder is milled into a volume-based D50 particle diameter of 0.1 to 10 μm with a pot mill to yield platy $LiCoO_2$ particles capable of conducting lithium ions in parallel with the plate surface. The resultant $LiCoO_2$ particles are susceptible to cleavage along a cleavage plane. The $LiCoO_2$ particles are cleaved by crushing, thereby producing $LiCoO_2$ template particles. Such $LiCoO_2$ particles are also produced by a procedure involving grain growth in a green sheet from $LiCoO_2$ powder slurry and crushing the green sheet, or a procedure involving synthesis of platy crystals, such as a flux process, a hydrothermal synthesis process, a single crystal growth process using a melt, and a sol gel process.

In this step, the profile of the primary grains 11 constituting the oriented positive electrode plate 16 can be controlled, as described below:

The proportion of the total area of low-angle primary grains with an orientation angle of over 0° and 30° or less can be controlled by adjusting at least one of the aspect ratio and the particle diameter of the $LiCoO_2$ template particles. Specifically, the proportion of the total area of low-angle primary grains can be increased, as the aspect ratio of the $LiCoO_2$ template particles is increased, and as the particle diameter of the $LiCoO_2$ template particles is increased. The aspect ratio and the particle diameter of the $LiCoO_2$ template particles each can be controlled by adjusting at least one of the particle diameter of the $Co_3O_4$ raw material powder and the $Li_2CO_3$ raw material powder, the milling conditions (such as the milling time, the milling energy, and the milling procedure) during milling, and classification after milling.

The proportion of the total area of the primary grains 11 with an aspect ratio of 4 or more can be controlled by adjusting the aspect ratio of the $LiCoO_2$ template particles. Specifically, the proportion of the total area of the primary grains 11 with an aspect ratio of 4 or more can be increased, as the aspect ratio of the $LiCoO_2$ template particles is increased. The procedure of adjusting the aspect ratio of the $LiCoO_2$ template particles is as described above.

The mean diameter of the primary grains 11 can be controlled by adjusting the particle diameter of the $LiCoO_2$ template particles.

The denseness of the oriented positive electrode plate 16 can be controlled by adjusting the particle diameter of the $LiCoO_2$ template particles. Specifically, the denseness of the oriented positive electrode plate 16 can be increased, as the particle diameter of the $LiCoO_2$ template particles is reduced.

(2) Production of Matrix Particles $Co_3O_4$ raw material powder is used as the matrix particles. The volume-based D50 particle diameter of the $Co_3O_4$ raw material powder may be any value, e.g., 0.1 to 1.0 μm and is preferably smaller than the volume-based D50 particle diameter of $LiCoO_2$ template particles. The matrix particles may also be produced by heating a $Co(OH)_2$ raw material at 500° C. to 800° C. for 1 to 10 hours. In addition to $Co_3O_4$, $Co(OH)_2$ particles may be used, or $LiCoO_2$ particles may be used as the matrix particles.

In this step, the profile of the primary grains 11 constituting the oriented positive electrode plate 16 can be controlled, as described below:

The proportion of the total area of low-angle primary grains with an orientation angle of over 0° and 30° or less can be controlled by adjusting the ratio of the particle diameter of the matrix particles with respect to the particle diameter of the $LiCoO_2$ template particles (which will be hereinafter referred to as "particle diameter ratio matrix/template"). Specifically, since the matrix particles are more easily incorporated into the $LiCoO_2$ template particles in the firing step, which will be described below, as the particle diameter ratio matrix/template is reduced, that is, as the particle diameter of the matrix particles decreases. Therefore, the proportion of the total area of low-angle primary grains can be increased.

The proportion of the total area of the primary grains 11 with an aspect ratio of 4 or more can be controlled by adjusting the particle diameter ratio matrix/template. Specifically, the proportion of the total area of the primary grains 11 with an aspect ratio of 4 or more can be increased, as the particle diameter ratio matrix/template is reduced, that is, as the particle diameter of the matrix particles decreases.

The denseness of the oriented positive electrode plate 16 can be controlled by adjusting the particle diameter ratio matrix/template. Specifically, the denseness of the oriented positive electrode plate 16 can be increased, as the particle diameter ratio matrix/template is reduced, that is, as the particle diameter of the matrix particles decreases.

(3) Production of Green Sheet

Mixed powder is obtained by mixing the $LiCoO_2$ template particles with the matrix particles at 100:0 to 3:97. While mixing the mixed powder, a dispersion medium, a binder, a plasticizer, and a dispersant, the mixture is stirred under reduced pressure, defoamed, and adjusted to a desired viscosity, to form a slurry. Next, the slurry prepared is subjected to a forming procedure capable of applying a shear force to the $LiCoO_2$ template particles, thereby forming a green body. Thus, the average orientation angle of the primary grains 11 can be adjusted to over 0° and 30° or less. The forming procedure capable of applying a shear force to the $LiCoO_2$ template particles preferably includes a doctor blade process. In the case of using the doctor blade process, the slurry prepared is cast on a PET film, thereby forming the green body, i.e., a green sheet.

In this step, the profile of the primary grains 11 constituting the oriented positive electrode plate 16 can be controlled, as described below:

The proportion of the total area of low-angle primary grains with an orientation angle of over 0° and 30° or less can be controlled by adjusting the forming speed. Specifically, the proportion of the total area of low-angle primary grains can be increased, as the forming speed is increased.

The mean diameter of the primary grains 11 can be controlled by adjusting the density of the green body. Specifically, the mean diameter of the primary grains 11 can be increased, as the density of the green body is increased.

The denseness of the oriented positive electrode plate 16 can be controlled also by adjusting the mixing ratio of the $LiCoO_2$ template particles and the matrix particles. Specifically, the denseness of the oriented positive electrode plate 16 can be reduced, as the number of the $LiCoO_2$ template particles is increased.

(4) Production of Oriented Sintered Plate

The green body of the slurry is placed on a setter made of zirconia, followed by heating at 500 to 900° C. for 1 to 10 hours (primary firing), to obtain a sintered plate as an intermediate. The sintered plate is placed on a zirconia setter while being vertically interposed between lithium sheets (e.g., $Li_2CO_3$-containing sheets), followed by secondary firing, to obtain a $LiCoO_2$ sintered plate. Specifically, the setter on which the sintered plate interposed between the lithium sheets is placed is put into an alumina sheath, followed by firing in the atmosphere at 700 to 850° C. for 1 to 20 hours. Thereafter, the sintered plate is further vertically interposed between lithium sheets, followed by firing at 750 to 900° C. for 1 to 40 hours, to obtain a $LiCoO_2$ sintered plate. This firing process may be performed in one or two steps. In the case of firing in two separate steps, the temperature in the first firing step is preferably lower than that in the second firing step. The total amount of the lithium sheets used in the secondary firing may be such that the molar ratio Li/Co the amount of Li in the green sheet and the lithium sheets with respect to the amount of Co in the green sheet is 1.0.

In this step, the profile of the primary grains 11 constituting the oriented positive electrode plate 16 can be controlled, as described below:

The proportion of the total area of low-angle primary grains with an orientation angle of over 0° and 30° or less can be controlled by adjusting the heating rate during firing. Specifically, sintering between the matrix particles is more suppressed, as the heating rate is increased, so that the proportion of the total area of low-angle primary grains can be increased.

The proportion of the total area of low-angle primary grains with an orientation angle of over 0° and 30° or less can be controlled also by adjusting the temperature to heat the intermediate. Specifically, sintering between the matrix grains is more suppressed, as the temperature to heat the intermediate is reduced, so that the proportion of the total area of low-angle primary grains can be increased.

The mean diameter of the primary grains 11 can be controlled by adjusting at least one of the heating rate during firing and the temperature to heat the intermediate. Specifically, the mean diameter of the primary grains 11 can be increased, as the heating rate is increased, and as the temperature to heat the intermediate is reduced.

The mean diameter of the primary grains 11 can be controlled also by adjusting at least one of the amount of Li (e.g., $Li_2CO_3$) and the amount of a sinter aid (e.g., boric acid and bismuth oxide) during firing. Specifically, the mean diameter of the primary grains 11 can be increased, as the amount of Li is increased, and as the amount of the sinter aid is increased.

The denseness of the oriented positive electrode plate 16 can be controlled by adjusting the profile during firing. Specifically, the denseness of the oriented positive electrode plate 16 can be increased, as the firing temperature is slowed, and as the firing time is increased.

EXAMPLES

The invention will be illustrated in more detail by the following examples.

Example 1

(1) Production of Lithium Secondary Battery

Figure 2B:
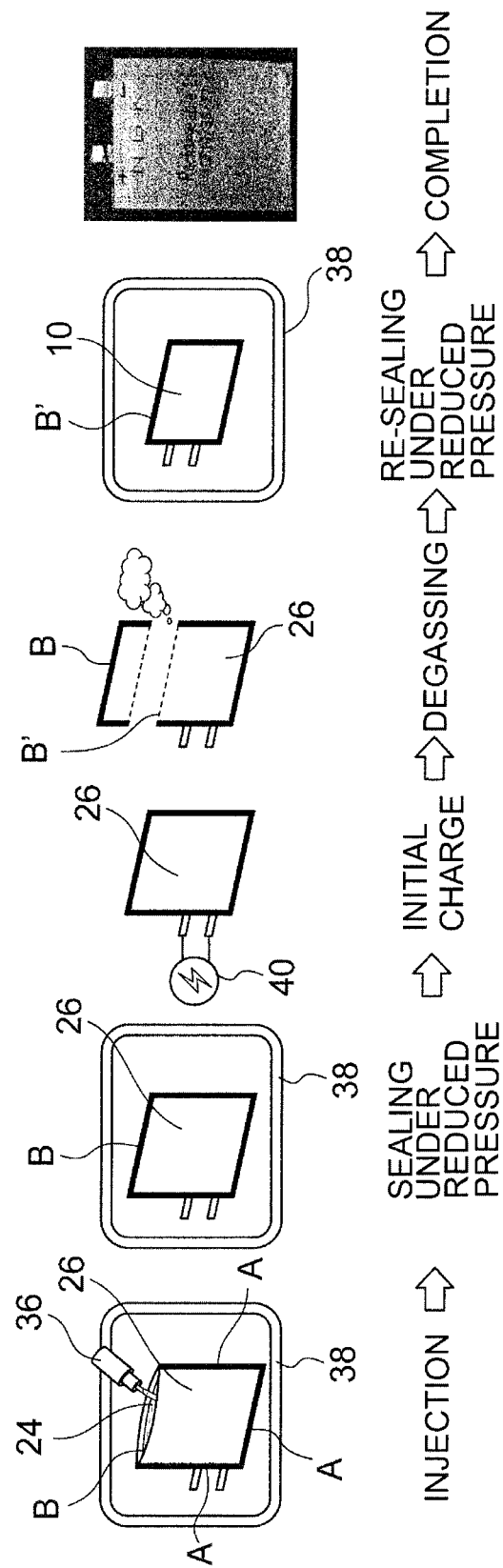
FIG. 2B illustrates an example of the latter half of the production process of the lithium secondary battery, showing steps subsequent to the steps shown in FIG. 2A.

The lithium secondary battery 10 in the form of a film-covered battery as schematically shown in FIGS. 1A and 1B was produced by procedures as shown in FIGS. 2A and 2B. Specifically, the procedures were as follows.

First, a $LiCoO_2$ sintered plate (which will be hereinafter referred to as LCO sintered plate) with a thickness of 90 μm was prepared. The LCO sintered plate was produced according to the aforementioned method for producing a lithium complex oxide sintered plate and satisfied the aforementioned various preferable conditions of the lithium complex oxide sintered plate. The sintered plate was cut into a square of 10.5 mm×9.5 mm with a laser processing machine, to obtain positive electrode plates 16 in the form of a plurality of chips.

As the exterior films 26, two pieces of aluminum laminate films (with a thickness of 61 μm and a three-layer structure of polypropylene film/aluminum foil/nylon film, manufactured by Showa Denko packaging Co., Ltd.) were prepared. As shown in FIG. 2A, the positive electrode plates 16 in the form of the plurality of chips were placed on one of the exterior films 26 via a positive electrode current collector 14 (an aluminum foil with a thickness of 9 μm), to form a positive electrode assembly 17. FIG. 2A shows the positive electrode plates 16 in the form of the plurality of chips, but there is no limitation to this, and the positive electrode plate 16 that is one piece not divided into the form of chips may be used to form the positive electrode assembly 17. At this time, the positive electrode current collector 14 was fixed to the exterior film 26 with an adhesive. A positive electrode terminal 15 was fixed to the positive electrode current collector 14 by welding so as to extend from the positive electrode current collector 14. Meanwhile, the negative electrode layer 20 (a carbon layer with a thickness of 130 μm) was placed on the other of the exterior films 26 via a negative electrode current collector 22 (a copper foil with a thickness of 10 μm) to form a negative electrode assembly 19. At this time, the negative electrode current collector 22 was fixed to the exterior film 26 with an adhesive. A negative electrode terminal 23 was fixed to the negative electrode current collector 22 by welding so as to extend from the negative electrode current collector 22. Further, the negative electrode 20 that is a carbon layer was a coated film containing a mixture of graphite as an active material and polyvinylidene fluoride (PVDF) as a binder.

As the separator 18, a porous polypropylene film (with a thickness of 25 μm and a porosity of 55%, manufactured by Polypore International, Inc.) was prepared. As shown in FIG. 2A, the positive electrode assembly 17, the separator 18, and the negative electrode assembly 19 were sequentially stacked so that the positive electrode plate 16 and the negative electrode layer 20 each face the separator 18, to obtain a laminate 28 with both sides covered by the exterior films 26 and the outer peripheral portions of the exterior films 26 protruding from the outer edges of the battery elements 12. The battery elements 12 (the positive electrode current collector 14, the positive electrode plate 16, the separator 18, the negative electrode layer 20, and the negative electrode current collector 22) thus constructed within the laminate 28 had a quadrangular shape with a size of 2.3 cm×3.2 cm and a thickness of 0.33 mm.

As shown in FIG. 2A, the three sides A of the laminate 28 obtained were sealed. The sealing was performed by hot-pressing the outer peripheral portion of the laminate 28 at 200° C. and 1.5 MPa for 15 seconds using a patch jig (heat bar) adjusted to a sealing width of 2.0 mm, to thermally fuse the outer peripheral portions of the exterior films 26 (aluminum laminate films) with each other. After sealing the three sides A, the laminate 28 was put into a vacuum dryer 34, to remove moisture and dry the adhesive.

As shown in FIG. 2B, the side B was temporarily sealed within a glovebox 38 in a reduced-pressure atmosphere with an absolute pressure of 5 kPa using a simple sealer, by inserting an injection device 36 into a gap formed between the pair of exterior films 26 on one remaining side B unsealed of the laminate 28 with the three outer edge sides A sealed, and injecting the electrolytic solution 24 therein. The electrolytic solution used was obtained by dissolving $LiPF_6$ in a mixed solvent containing ethylene carbonate (EC) and methylethyl carbonate (MEC) at 3:7 (volume ratio) to a concentration of 1.0 mol/L and further dissolving vinylene carbonate (VC) therein to a concentration of 2% by weight.

Thus, the laminate with the side B temporarily sealed was initially charged, followed by aging for 7 days. Finally, the outer peripheral portion of the remaining one side B (the end portion not including the battery elements) was cut off to perform degassing.

As shown in FIG. 2B, the side B' generated by cutting off the temporary sealing was sealed within the glovebox 38 in a reduced-pressure atmosphere with an absolute pressure of 5 kPa. This sealing was also performed by hot-pressing the outer peripheral portion of the laminate 28 at 200° C. and 1.5 MPa for 15 seconds, to thermally fuse the outer peripheral portions of the exterior films 26 (aluminum laminate films) with each other. Thus, the side B' was sealed with the pair of exterior films 26, to form the lithium secondary battery 10 in the form of a film-covered battery. The lithium secondary battery 10 was taken out from the glovebox 38, and excess portions on the outer peripheries of the exterior films 26 were cut off, to adjust the shape of the lithium secondary battery 10. Thus, the lithium secondary battery 10 with the four outer edge sides of the battery elements 12 sealed by the pair of exterior films 26 and with the electrolytic solution 24 injected therein was obtained. The lithium secondary battery 10 obtained had a rectangular shape with a size of 38 mm×27 mm and a thickness of 0.45 mm or less, and a capacity of 30 mAh.

(2) Evaluation

The lithium secondary battery produced was evaluated as follows.

<Observation of Cross-Sectional Shapes of Negative Electrode Layer and Separator>

Figure 6:
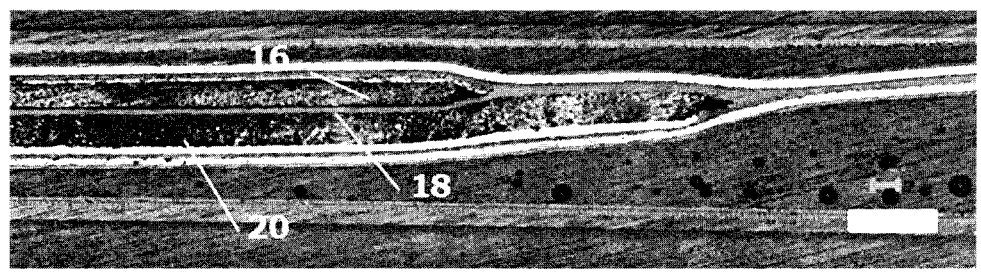
FIG. 6 is a laser microscope image capturing a cross section of a lithium secondary battery produced in Example 1.
Figure 7:
FIG. 7 is a schematic diagram of a surface profile illustrating a height H of a protrusion generated on a card surface due to a repeated bending test.

A cross section of the lithium secondary battery 10 was captured with a laser microscope, and the cross-sectional shapes of the negative electrode layer 20 and the separator 18 were observed, to determine whether or not the portions of the negative electrode layer 20 and the separator 18 corresponding to the outer extension E were deviated toward the positive electrode plate 16 side from the portions of the negative electrode layer and the separator corresponding to the body M. The results were as shown in Table 1, and the deviation of the outer extension E was observed therein. Further, FIG. 6 shows a laser microscope image obtained by capturing a cross section of the lithium secondary battery produced in Example 1.

<Distance D Between End of Positive Electrode Plate and End of Negative Electrode Layer>

The distance D between the end of the positive electrode plate and the end of the negative electrode layer was measured as follows. First, a transmission X-ray image of the lithium secondary battery was captured from the positive electrode side under the following conditions:

Measuring device: Three-dimensional measurement X-ray CT apparatus (TDM1300-IW/TDM1000-IW, switchable, manufactured by Yamato Scientific Co., Ltd.);

Measurement mode: Microfocus X-ray transmission observation (DR method);

Tube voltage: 70 kV;

Tube current: 60 μA;

Al filter (1 mm); and

Irradiation time: 134 seconds.

According to the technique of transmission X-ray photography, the exterior film 26 and the positive electrode current collector 14 (aluminum foil) are transparent, so that the contrast between the positive electrode plate 16 and the negative electrode current collector 22 (copper foil) can be observed. Since the region of the negative electrode current collector 22 (copper foil) is the same as the region of the negative electrode layer 20, the distance D between the end of the positive electrode plate 16 and the end of the negative electrode layer 20 can be measured based on the contrast between the positive electrode plate 16 and the negative electrode current collector 22 (copper foil). Specifically, the distance from the end of the positive electrode plate 16 (a whole positive electrode plate composed of a plurality of positive electrode plate chips) to the end of the negative electrode layer 20 was measured at three points on each of the four sides of the lithium secondary battery 10, to determine average values $D_1$, $D_2$, $D_3$, and $D_4$ of the distance on each of the four sides. Table 1 shows the minimum value among $D_1$ to $D_4$ as a typical value of the distance D between the end of the positive electrode plate 16 and the end of the negative electrode layer 20 in the lithium secondary battery 10.

<Repeated Bending Test>

The film-covered battery obtained was embedded in an epoxy resin, to produce a card with built-in battery having a rectangular shape with a thickness of 0.76 mm and a size of 86 mm×54 mm. The card with built-in battery was subjected to a bending test according to JIS X 6305-1. Specifically, the card was set in a card holder of a bending tester and subjected to a bending test of 1000 times in total by bending to make the front surface convex in the longitudinal direction 250 times, bending to make the front surface convex in the short direction 250 times, bending to make the back surface convex in the longitudinal direction 250 times, and bending to make the back surface convex in the short direction 250 times. Thereafter, the surface profile of the battery-embedded part in the card was measured using a surface roughness meter (TALYSURF, manufactured by TAYLOR HOBSON). That is, a protrusion was generated on the exterior film around the battery-embedded part of the card by the repeated bending test to some extent, and its height was measured. Specifically, as schematically shown in FIG. 6, a peak corresponding to the protrusion was specified on the surface profile obtained, then a base line BL of the peak was drawn, and the distance in the perpendicular direction from the base line BL to the peak top PT was measured as a height H of the protrusion, to determine the presence or absence of a wrinkle according to the following criteria. The results were as shown in Table 1.

No wrinkle: The height H of the protrusion was less than 40 μm

Wrinkle occurred: The height H of the protrusion was 40 μm or more

Example 2

A battery was produced and evaluated in the same manner as in Example 1 except that the thickness of the positive electrode plate 16 was changed to 70 μm, and the thickness of the negative electrode layer 20 was changed to 80 μm. The results were as shown in Table 1, and the deviation of the outer extension E was observed therein.

Example 3

A battery was produced and evaluated in the same manner as in Example 1 except that the thickness of the positive electrode plate 16 was changed to 120 μm, and the thickness of the negative electrode layer 20 was changed to 160 μm. The results were as shown in Table 1, and the deviation of the outer extension E was observed therein.

Example 4

A battery was produced and evaluated in the same manner as in Example 1 except that the size of the negative electrode layer 20 was slightly reduced, and the distance D between the end of the positive electrode plate 16 and the end of the negative electrode layer 20 was changed to 200 μm. The results were as shown in Table 1, and the deviation of the outer extension E was observed therein.

Example 5

A battery was produced and evaluated in the same manner as in Example 1 except that: 1) the thickness of the positive electrode plate 16 was changed to 80 μm, and the thickness of the negative electrode layer 20 was changed to 90 μm; and 2) the size of the negative electrode layer 20 was further reduced, and the distance D between the end of the positive electrode plate 16 and the end of the negative electrode layer 20 was changed to 50 μm. The results were as shown in Table 1.

Example 6 (Comparison)

A battery was produced and evaluated in the same manner as in Example 1 except that the size of the negative electrode layer 20 was further reduced, and the distance D between the end of the positive electrode plate 16 and the end of the negative electrode layer 20 was changed to 30 μm. The results were as shown in Table 1, and the deviation of the outer extension E could not be observed therein. At this time, the outlines of the exterior films 26 following the shapes of the positive electrode plate 16 and the negative electrode layer 20 did not converge toward the outer peripheral edge in multiple steps, and wrinkles occurred in the vicinity of the end of the positive electrode plate 16.

TABLE 1

|  | Production conditions | | | Cross-sectional shapes of negative electrode layer and separator Whether outer extension deviated toward positive electrode plate | | Repeated bending test Presence or absence of wrinkle on surface of card |
| --- | --- | --- | --- | --- | --- | --- |
|  | Thickness of positive electrode plate (μm) | Thickness of negative electrode layer (μm) | Distance D between end of positive electrode plate and end of negative electrode layer (μm) |  | Thickness of battery (μm) |  |
| Example 1 | 90 | 130 | 500 | Deviated | 440 | None |
| Example 2 | 70 | 80 | 500 | Deviated | 380 | None |
| Example 3 | 120 | 160 | 500 | Deviated | 500 | None |
| Example 4 | 90 | 130 | 200 | Deviated | 440 | None |

TABLE 1-continued

| | Production conditions | | | Cross-sectional shapes of negative electrode layer and separator Whether outer extension deviated toward positive electrode plate | | Repeated bending test Presence or absence of wrinkle on surface of card |
|---|---|---|---|---|---|---|
| | Thickness of positive electrode plate (μm) | Thickness of negative electrode layer (μm) | Distance D between end of positive electrode plate and end of negative electrode layer (μm) | | Thickness of battery (μm) | |
| Example 5 | 80 | 90 | 50 | Deviated | 400 | None |
| Example 6* | 90 | 130 | 30 | Not deviated | 440 | Present |

Symbol * represents a comparative example.

What is claimed is:

1. A lithium secondary battery comprising:
   a positive electrode plate which is a lithium complex oxide sintered plate;
   a negative electrode layer which has a size larger than the size of the positive electrode plate and contains carbon;
   a separator which is interposed between the positive electrode plate and the negative electrode layer and has a size larger than the sizes of the positive electrode plate and the negative electrode layer;
   an electrolytic solution with which the positive electrode plate, the negative electrode layer, and the separator are impregnated; and
   a pair of exterior films having outer peripheral edges directly sealed with each other to form an internal space, the internal space accommodating the positive electrode plate, the negative electrode layer, the separator, and the electrolytic solution,
   wherein the separator has an outer peripheral portion in close contact with at least the outer peripheral edge of the exterior film on the positive electrode plate side of the internal space or a peripheral region in the vicinity thereof, so as to separate a compartment accommodating the positive electrode and a compartment accommodating the negative electrode from each other,
   wherein the lithium secondary battery comprises:
   a body in which a multi-layer structure including the positive electrode plate, the separator, the negative electrode layer, and the pair of exterior films exists throughout the entire area of the body; and
   an outer extension which is located outwardly of the outer peripheral edge of the positive electrode plate and includes the separator, the negative electrode layer, and the pair of exterior films, and
   wherein the portions of the negative electrode layer and the separator corresponding to the outer extension are deviated toward the positive electrode plate side of the internal space from the portions of the negative electrode layer and the separator corresponding to the body.

2. The lithium secondary battery according to claim 1, which is a thin secondary battery capable to be built in a card.

3. The lithium secondary battery according to claim 1, wherein the lithium secondary battery has a thickness of 350 to 500 μm.

4. The lithium secondary battery according to claim 1, wherein the positive electrode plate has a thickness of 70 to 120 μm.

5. The lithium secondary battery according to claim 1, wherein the end of the positive electrode plate and the end of the negative electrode layer are apart from each other at a distance of 50 to 2000 μm throughout the outer periphery of the positive electrode plate and the negative electrode layer.

6. The lithium secondary battery according to claim 1, wherein the negative electrode layer has a thickness of 70 to 160 μm.

7. The lithium secondary battery according to claim 1, wherein the exterior films have a thickness per piece of 50 to 80 μm.

8. The lithium secondary battery according to claim 1, wherein each of the exterior films is a laminate film containing a resin film and a metal foil.

9. The lithium secondary battery according to claim 1, wherein the separator is made of polyolefin, polyimide, or cellulose.

10. The lithium secondary battery according to claim 1, wherein the lithium complex oxide is lithium cobaltate.

11. The lithium secondary battery according to claim 1, wherein the lithium complex oxide sintered plate is an oriented positive electrode plate containing a plurality of primary grains composed of the lithium complex oxide, the plurality of primary grains being oriented at an average orientation angle of over 0° and 30° or less with respect to the plate face of the positive electrode plate.

12. The lithium secondary battery according to claim 1, wherein the lithium secondary battery further comprises a positive electrode current collector and a negative electrode current collector.

13. A card with built-in battery, comprising:
   a resin substrate; and
   the lithium secondary battery according to claim 1, the lithium secondary battery being embedded within the resin substrate.

* * * * *